United States Patent
Lyon

(10) Patent No.: US 6,911,057 B2
(45) Date of Patent: Jun. 28, 2005

(54) APPARATUS FOR CONVERTING COAL INTO FUEL CELL QUALITY HYDROGEN AND SEQUESTRATION-READY CARBON DIOXIDE

(75) Inventor: Richard K. Lyon, Pittstown, NJ (US)

(73) Assignee: General Electric Company, Schnectady, NY (US)

(*) Notice: Subject to any disclaimer, the term of this patent is extended or adjusted under 35 U.S.C. 154(b) by 74 days.

(21) Appl. No.: 10/673,346

(22) Filed: Sep. 30, 2003

(65) Prior Publication Data

US 2004/0060237 A1 Apr. 1, 2004

Related U.S. Application Data

(62) Division of application No. 09/917,801, filed on Jul. 31, 2001, now Pat. No. 6,669,917.

(51) Int. Cl.[7] ................................................ C10J 3/54
(52) U.S. Cl. ..................... 48/77; 48/73; 48/99; 48/101; 48/202; 48/210; 422/142; 422/145; 422/147; 422/190; 422/214; 422/219; 422/223; 422/233; 422/234
(58) Field of Search ........................... 48/77, 101, 210, 48/86 R, 73, 99, 202; 422/139, 141, 142, 145, 147, 211, 188–190, 232–234, 213, 214, 219, 223; 423/437.1, 655, 648.1, 656

(56) References Cited

U.S. PATENT DOCUMENTS

| | | | | |
|---|---|---|---|---|
| 3,807,090 A | * | 4/1974 | Moss | .......................... 48/128 |
| 5,339,754 A | | 8/1994 | Lyon | |
| 5,509,362 A | | 4/1996 | Lyon | |
| 5,776,212 A | * | 7/1998 | Leas | .............................. 48/73 |
| 5,827,496 A | | 10/1998 | Lyon | |
| 6,667,022 B2 | * | 12/2003 | Cole | ....................... 423/437.1 |
| 6,669,917 B2 | * | 12/2003 | Lyon | ....................... 423/437.1 |

* cited by examiner

Primary Examiner—Basia Ridley
(74) Attorney, Agent, or Firm—Nixon & Vanderhye P.C.

(57) ABSTRACT

An apparatus for burning coal to produce substantially pure hydrogen for use in fuel cells, together with "sequestration ready" carbon dioxide and a stream of oxygen depleted air for powering gas turbines. The apparatus includes two fluidized bed reactors and a third transfer line reactor. The first reactor is supplied with coal particles or "char" and fluidized with high temperature steam. The second reactor is fluidized with high temperature steam and the third reactor is fluidized by compressed air. Solids circulated among these three reactors include a mixture of materials containing coal, calcium compounds (present as CaO, $CaCO_3$ and mixtures thereof) and iron compounds (present as FeO, $Fe_2O_3$ and mixtures thereof).

9 Claims, 1 Drawing Sheet

APPARATUS FOR CONVERTING COAL INTO FUEL CELL QUALITY HYDROGEN AND SEQUESTRATION-READY CARBON DIOXIDE

CROSS-REFERENCE TO RELATED APPLICATION

This application is a divisional of Ser. No. 09/917,801, filed Jul. 31, 2001, now U.S. Pat. No. 6,669,917.

BACKGROUND OF THE INVENTION

The present invention relates to methods and apparatus for converting coal, air and high temperature steam into three separate gas streams—one consisting of wet, substantially pure hydrogen, a second containing "sequestration-ready" carbon dioxide, i.e., $CO_2$ that is relatively pure and is at an elevated pressure thereby rendering its disposal less difficult, and a third stream consisting of oxygen depleted air.

More particularly, the invention relates to a process in which mixtures of coal, calcium and iron compounds are circulated among multiple reactors charged with either high temperature steam or compressed air that produce essentially pure hydrogen for use in fuel cells as a product of a controlled gasification reaction. The process according to the invention results in a separable and substantially pure carbon dioxide waste stream having residual amounts of sulfur dioxide, and an oxygen depleted air stream having high temperature heat that can be used, for example, in downstream power generation subsystems. The oxidation/reduction reactions of the present invention are much more thermodynamically efficient than conventional fossil fuel mixed combustion systems and offer significant environmental advantages over prior art processes using coal or other fossil fuels or biomass fuels to generate heat and combustion gases for use in gas turbine engines.

During the $21^{st}$ century, the United States will continue to rely heavily on fossil fuels, such as natural gas, oil and petroleum distillates, as the primary source of fuel for gas turbine engines used to generate electrical power. Recently, the use of substantially pure hydrogen in fuel cells has been found to be more efficient and virtually pollution-free as compared to other conventional fossil fuel/air combustion technologies. Hydrogen fuel cells would be an ideal solution to many of the nation's energy needs as a clean-burning fuel source. However, the need exists for a thermodynamically-efficient and economical process capable of producing large amounts of pure hydrogen from a readily available and inexpensive energy resource such as coal.

Various conventional systems exist for oxidizing (burning) coal to generate free hydrogen in addition to producing heat for generating steam. Invariably, such systems pose significant environmental problems because of the potential release of oxidized carbon and sulfur compounds into the atmosphere from burning coal. Conventional hydrogen generating methods also involve high equipment costs due to the inefficiencies inherent in attempting to recover and isolate hydrogen from the other products of fossil fuel/air combustion.

It is also well known that the carbon dioxide resulting from coal-fired systems contributes to the greenhouse effect in the atmosphere and potential global warming. Other types of air pollution produced by coal combustion include particulate emissions, such as fine particles of ash resulting from pulverized coal firing, as well as the release of undesirable oxides of nitrogen, chiefly NO and $NO_2$.

Thus, a significant need exists to produce relatively pure free hydrogen for use in electrical power generation in an economical and thermodynamically efficient manner, but without polluting the atmosphere. The need also exists to control the nature and extent of any carbon dioxide, and sulfur dioxide emissions created during coal combustion by isolating and disposing of the oxidized contaminants without releasing them into the atmosphere. Ideally, coal and other fossil fuels could be used to generate heat in a manner that allows the by-products of combustion, particularly $CO_2$, to be readily and economically recovered at elevated pressure and in a relatively pure state, i.e., making the $CO_2$ "sequestration-ready."

In the past, a number of different $CO_2$ disposal methods have been proposed such as pumping liquid $CO_2$ into deep parts of the ocean. However, one recurring problem in the disposal of $CO_2$ concerns the purity of the waste stream itself. Since most disposal options involve liquid $CO_2$, it is generally accepted that for $CO_2$ to be "sequestration-ready," it cannot contain more than small amounts of impurities or other gases that do not liquefy under pressure.

In addition to air pollution problems, the combustion of coal to drive gas turbine engines suffers from the same limitations in thermodynamic efficiency inherent in all systems that rely on mixed (air) combustion of coal as the primary heat source. Gas turbines are considered to be among the lowest capital cost systems available for generating electrical power. However, their thermodynamic efficiency is notably lower than other systems. Although the efficiency increases with increasing turbine inlet temperature, the hot gases produced by coal firing contain fly ash which can be erosive to turbine blades. The higher temperature exhaust vapors can also be corrosive because of the acidic by-products of coal combustion, such as sulfur dioxide and HCl. Consequently, the maximum turbine inlet temperature that can be tolerated for coal firing is considerably lower than that associated with a "clean" fuel, such as oil or natural gas.

Over the years, some improvements in gas turbine metallurgy have increased the inlet temperatures that could be tolerated with coal-fired systems. By definition, the same technological advances serve to increase the inlet temperatures for cleaner fuels such as natural gas. Thus, the disadvantages of coal relative to cleaner fuels remain regardless of the gas turbine metallurgy involved and prevent coal despite its lower cost from being considered an attractive gas turbine fuel. The gas turbine industry has long recognized that if a process could be developed for burning coal in a manner that produced large quantities of relatively "clean" hot gases that were not erosive or corrosive, coal could become a much more economically viable fuel source for use in electrical power generation.

One proposed solution to the problem of using coal to power gas turbines is a process known as "gasification" in which coal and steam are fed to a high temperature reactor vessel and react to form a mixture of $H_2$, CO and $CO_2$. Because the gasification reaction is endothermic, heat must be supplied in some manner. Thus, in most gasification designs, air is mixed with the high temperature steam so that a portion of the coal burns while the remainder reacts with steam to form $H_2$, CO and $CO_2$. In other designs, a portion of the fuel solids are heated by combustion and then mixed with coal and steam to supply the heat needed to drive the gasification reaction forward.

The literature describes a coal gasification process in which a $CO_2$ acceptor (either limestone or dolomite) circulates between a pair of fluid beds, one fluidized with steam and the other with air. See G. P. Curran, C. E. Fink, and E. Gorin (Chapter 10 in FUEL GASIFICATION, ACS Advances in Chemistry series 69, 1967). The temperature in the steam-fluidized bed remains low enough so that the $CaO+CO_2=CaCO_3$ reaction gasifies coal to virtually pure hydrogen. Only part of the carbon in the coal, however, becomes gasified in the steam fluidized reactor. The remainder moves to an air fluidized bed where it is oxidized ("burned"), liberating heat and decomposing the $CaCO_3$ back into CaO. Since the CO is in equilibrium with the $CO_2$ via the well-known water gas shift reaction, removal of the latter removes the former. The basic gasification process has the advantage of producing relatively pure hydrogen, but suffers from a disadvantage in that the $CO_2$ is released directly into the atmosphere along with air and other oxidized by products of coal combustion such as sulfur dioxide.

U.S. Pat. Nos. 5,339,754; 5,509,362; and 5,827,496 (incorporated herein by reference) disclose a method for burning fuels using a catalyst that can be readily reduced when in an oxidized state, and then readily oxidized when in a reduced state. The fuel and air are alternately contacted with the catalyst. The fuel reduces the catalyst and is oxidized to $CO_2$ and water vapor. Thereafter, the air oxidizes the catalyst and is depleted of oxygen. Thus, combustion is effected without the need to mix the fuel and air either prior to or during the combustion process. If means are provided whereby the $CO_2$, water vapor and oxygen-depleted air are directed in different directions as they leave the combustion process, mixing can be completely avoided. This later method of combustion has been called "unmixed combustion."

The total volume of combustion gases produced by unmixed combustion is comparable to that produced in conventional combustion, but with one significant difference. The volume of the $CO_2$+water vapor steam represents only a small part of the total. As those skilled in the art will appreciate, the cost of removing acid gases from combustion effluents by scrubbing increases with the volume of gas being scrubbed. Thus, if unmixed combustion can be accomplished such that the acid gases leave the combustion process in the form of a $CO_2$+ water vapor steam, the volume of gas that must be scrubbed can be substantially reduced, with a commensurate lower operating cost. As detailed below, operating unmixed combustion in a manner such that the acid gases leave the combustor in the $CO_2$+ water vapor steam requires an appropriate choice of catalyst and close control over the initial combustion reaction and subsequent decomposition reaction.

The subject matter of the '362 patent is discussed in detail in a paper presented at the Oct. 26–27, 1998 meeting of the Western States Section of the Combustion Institute (Paper No. 98F-36). The paper discloses a hypothetical process for using coal to power a gas turbine and reports on a series of preliminary experiments using an atmospheric pressure fluid bed of powdered chemically pure iron oxide (i.e., FeO/$Fe_2O_3$). The gas used to fluidize the bed can be switched from air to 5% $SO_2$+95% $N_2$ balance and back again. The experiments involved two basic process steps. In the first step, a bed fully oxidized to $Fe_2O_3$ was fluidized with the 5% $SO_2$+95% $N_2$ at a temperature of 857° C. A small amount of coal was then injected into this bed while the gases coming out of the bed were continuously analyzed. In a second step, the fluidizing gas was switched to air while continuing to analyze the gases coming from the bed.

The Combustion Institute paper also proposes a conceptual design for a process to use coal to power a gas turbine. As shown in FIG. 4 of the paper, the FeO/$Fe_2O_3$ catalyst is used as a fluidized powder which circulates between a first fluid bed fluidized with steam and a second bed fluidized with compressed air from the compressor section of a gas turbine. Within this bed, FeO is oxidized to $Fe_2O_3$—a strongly exothermic reaction that depletes the compressed air of oxygen while heating the air. The heated compressed air (now oxygen-depleted) can then be used to drive the expander section of a gas turbine. The Combustion Institute paper contemplates using pulverized coal as the main fuel source. See FIG. 4.

Thus, the prior art contains separate teachings of means for achieving the goal of oxidating coal to sequestration-ready $CO_2$ and of means for achieving the goal of gasifying of coal to relatively pure hydrogen. The prior art, however, does teach, show or suggest means for achieving both these goals in the same process. A definite need exists for an improved method of burning (oxidizing) coal using unmixed combustion to produce sequestration-ready $CO_2$, relatively pure hydrogen while at the same time creating a hot gas stream for use in generating electrical power by expansion through gas turbine engines.

BRIEF SUMMARY OF THE INVENTION

The present invention provides a new process for burning coal to produce hydrogen for fuel cells, oxygen depleted air for powering gas turbines, and sequestration-ready $CO_2$. The process operates at conditions such that all of the chemical reactions involved are thermodynamically favorable and readily occur and in a manner such that the process has a heat balance consistent with a practical industrial application.

In the preferred exemplary embodiment of the invention, two bubbling fluidized bed reactors and a transfer line reactor are utilized in combination. The first fluidized bed reactor (referred to herein as the "coal gasification reactor"; see Table 1) operates at 800° C., and is supplied with coal particles or "char" and fluidized with high temperature steam, e.g., superheated steam at a pressure of about 7 Atm. The second fluidized bed reactor (called the "$CaCO_3$ decomposition reactor") is also fluidized with steam and operates at about 1040° C. and 7 Atm. The third "FeO oxidation reactor" uses compressed air at about 7 Atm. and reaches an operating temperature of about 1525° C. Solids circulated among these three reactors include a mixture of materials containing calcium compounds (present as CaO, $CaCO_3$ and mixtures thereof) and iron compounds (present as FeO, $Fe_2O_3$ and mixtures thereof).

In the first fluidized bed reactor, coal is gasified by the steam in the presence of CaO to produce $CaCO_3$ and relatively pure hydrogen (for use in, e.g., fuel cells) per the $CO_2$ acceptor process described above. Only part of the coal char input to the gasification reactor, however, is gasified to produce hydrogen. The remainder of the coal char is burned to supply thermal energy necessary to regenerate the $CaCO_3$ back to CaO. The solids are circulated between the gasification reactor and the middle fluidized bed reactor where they mix with solids from the transfer line reactor. Carbon in the middle bed fluidized bed reactor reacts with $Fe_2O_3$ in the transfer line reactor and the temperature in the middle fluidized bed reactor is sufficiently high to decompose $CaCO_3$ back into CaO.

Thus, the solids recirculating out of the middle fluidized bed reactor consist mainly of CaO and FeO, while gaseous $CO_2$ and minor amounts of $SO_2$ are removed in a separate stream. Some of the solids mixture returns to the first fluidized gasification reactor and the remainder passes into the transfer line reactor. (FeO oxidation reactor). In the latter, FeO reacts with air in an endothermic reaction to liberate heat. The hot oxygen depleted air leaves the transfer line reactor and is supplied to the gas turbine while the hot solids return to the middle fluidized bed.

Because the reaction between FeO and hot air is rapid and exothermic (in the range of −292 kJ/mole), the temperature of the vitiated air increases to a point that the hot gas can be expanded across a turbine to provide shaft power for electricity and/or drive the air compressor. Excess enthalpy from the expanded and vitiated air can also be recovered by a boiler that provides high-pressure steam for use in the fluidization.

The gas stream leaving the FeO oxidation reactor normally passes through a cyclone or other hot gas cleanup system to remove ash and elutriated iron oxides before being expanded across a turbine. The hot gases from the $CaCO_3$ decomposition reactor can also be passed through a heat exchanger followed by a condenser to remove water and residual fine solids. The remaining gases consist of $CO_2$ and $SO_2$ at elevated pressure, with small amounts of other pollutants and products of incomplete combustion. The $SO_2$ and other pollutants can be removed by wet scrubbing or other treatment, leaving an essentially pure stream of pressurized $CO_2$ for sequestration or discharge.

Accordingly, in its broader aspects, the invention relates to a process for converting coal into fuel cell quality hydrogen and substantially pure, i.e., sequestration ready, carbon dioxide in a much more thermodynamically efficient manner using solids mixtures containing coal, calcium compounds and iron compounds circulating among three fluidized bed reactors operating simultaneously.

In another aspect, the invention relates to a new method for achieving the unmixed combustion of coal to produce fuel cell quality hydrogen and sequestration-ready carbon dioxide waste using first, second and third reactors whereby the first reactor receives inputs of coal and steam to produce an output gaseous stream of wet hydrogen gas, the second reactor produces an output stream of wet carbon dioxide and the third reactor receives an input stream and produces an output stream of oxygen-depleted air.

In yet another aspect, the invention relates to a new apparatus for performing the unmixed combustion of coal to produce substantially pure hydrogen, carbon dioxide and oxygen-depleted air consisting of a first, second and third reactors with solids circulating among the reactors containing a carefully-controlled balance of calcium compounds and mixtures thereof and iron compounds and mixtures thereof.

In still a further aspect, the invention relates to a new unmixed combustion apparatus capable of producing an output gaseous stream of wet, fuel cell quality hydrogen gas, substantially pure, i.e., "sequestration-ready" carbon dioxide and oxygen depleted air in a much more thermodynamically efficient manner than conventional unmixed combustion systems.

DETAILED DESCRIPTION OF THE INVENTION

Figure 1:
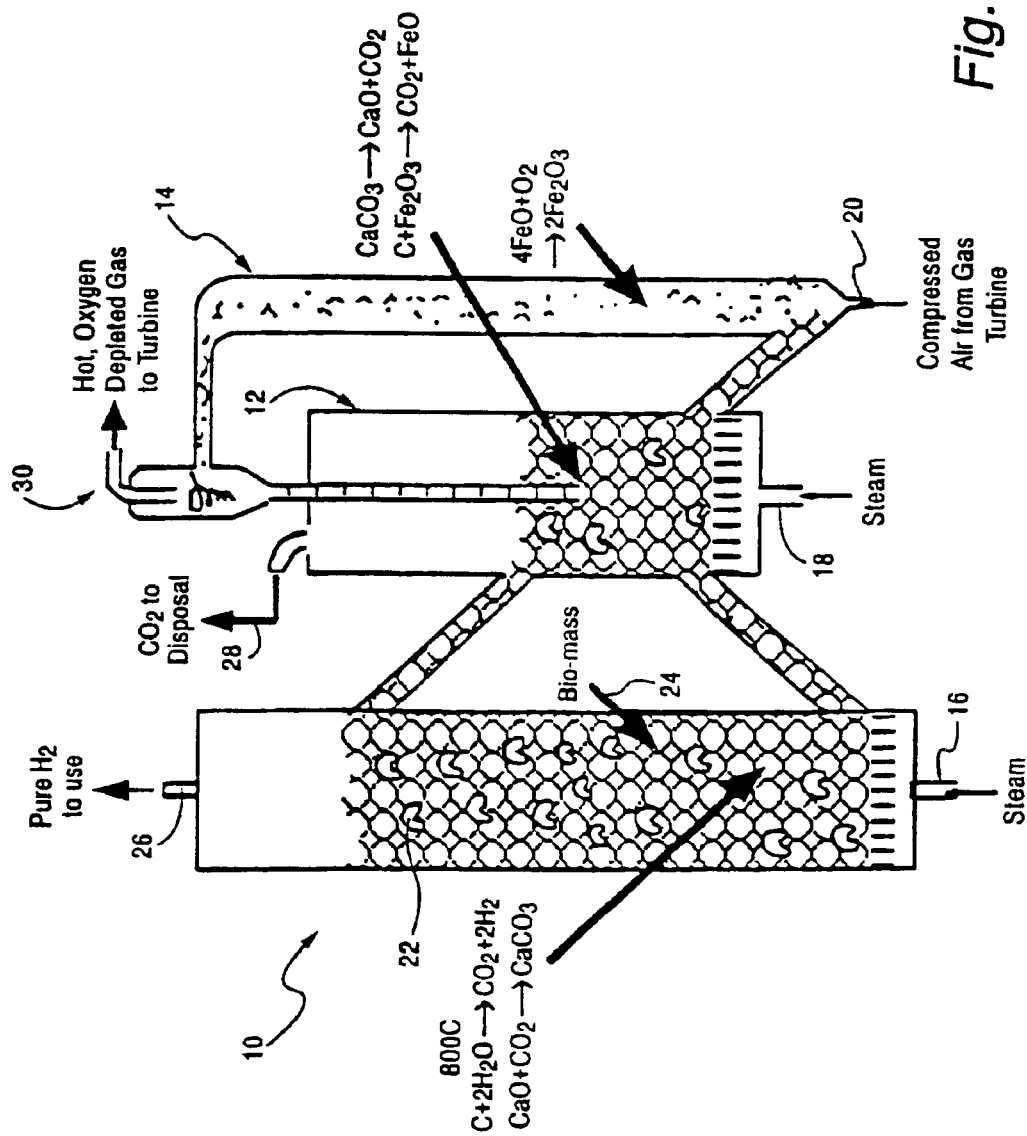
FIG. 1 is a schematic diagram illustrating the basic components and process according to the invention.

FIG. 1 shows schematically an exemplary embodiment of the invention that converts input streams of coal, steam and compressed air into separate output streams of relatively pure hydrogen for use in, e.g., fuel cells, sequestration-ready $CO_2$, and high temperature oxygen depleted air for use in powering a gas turbine to produce electricity. In this embodiment, two bubbling fluidized bed reactors 10, 12 are used together with transfer line reactor 14. The first fluidized bed reactor 10 on the left in FIG. 1 (the coal gasification reactor) is fluidized with a gas consisting primarily of high pressure superheated steam via inlet 16 at the bottom of the reactor.

The bubbling bed 12 in the center of FIG. 1 (the $CaCO_3$ decomposition reactor) likewise is fluidized with a gas consisting of superheated steam via inlet 18 or recycled $CO_2$ or mixtures thereof. The transfer line reactor 14 (the FeO oxidation reactor) is fluidized with compressed air via inlet 20. The solids that circulate among these three reactors include a mixture of solids, some of which have a high content of $CaCO_3$ when in an uncalcined state, e.g., limestone and dolomite, and some of which have a high iron content, e.g., iron ore, purified iron oxide, red mud, and pulverized scrap iron.

In the leftmost of the three reactors shown in FIG. 1, coal 22 enters the fluidized bed at 24 and becomes gasified by steam in the presence of CaO to produce $CaCO_3$ and relatively pure hydrogen per the $CO_2$ acceptor process described above. The hydrogen leaves the first fluidized bed reactor via stream 26 for use in hydrogen fuel cells.

Significantly, in the $CO_2$ acceptor process, only part of the coal char input to the gasification reactor 10 is gasified to produce hydrogen. The remainder is burned to supply the thermal energy necessary to regenerate the $CaCO_3$ back into CaO. That is, heat from burning part of the coal is used to decompose the $CaCO_3$ back to CaO, however the combustion is done indirectly. Solids are circulated between the gasification reactor 10 and the middle fluid bed $CaCo_3$ decomposition reactor 12 where they mix with solids from the transfer line reactor 14. Carbon in the former reacts with $Fe_2O_3$ in the latter. The temperature in the middle or second fluidized bed reactor 12 remains high enough so that $CaCO_3$ decomposes back to CaO. Thus, the solids recirculating out of the middle fluid bed reactor consist mainly of CaO and FeO while "sequestration ready" $CO_2$ (and any residual $SO_2$ present) leave the middle fluidized bed reactor via stream 28.

Part of the mixture of solids returns to the gasification reactor 10 and the remainder goes to the transfer line reactor 14. In the transfer line reactor 14, FeO reacts with air to liberate heat. Hot, oxygen depleted air exits the line reactor 14 via stream 30 and may be supplied to a gas turbine, while the hot solids return to the middle fluidized bed reactor 12.

EXAMPLE 1

Computational experiments were done with the HSC program. The computational procedure is an iterative one in which initial temperatures are assumed for both of the bubbling bed reactors and the transfer line reactor. Equilibrium product compositions are calculated at those temperatures. The heat and mass balances are then calculated to produce a new set of operating temperatures and the process is repeated to obtain results mutually consistent within a reasonable margin of error.

Computational experiments of this type produce three different types of results. The calculational procedure can fail to converge, showing that the process being studied is not capable of adiabatic operation. Alternatively, the calculations can converge showing that the process is capable of adiabatic operation but under conditions in which the chemical equilibrium will not result in a practically useful process. Third, the calculations can converge to a result showing that the process being studied is capable of adiabatic operation at conditions under which the chemical equilibrium will yield a practically useful process.

In doing the above calculations, the computer program assumes that $CaO/CaCO_3$, and $FeO/Fe_2O_3$ act as perfect catalysts, i.e., all the $CaO/CaCO_3$, and $FeO/Fe_2O_3$ present reacts to equilibrium. It is, however, well known that catalysts in general have a finite life, i.e., they slowly tend to become inert. To maintain an acceptable level of catalytic activity, the general practice is to continually remove and replace small amounts of the catalyst. For catalytic processes that involve coal, there is the added complication that coal contains ash. While conditions can be adjusted so that most of this ash exits the reactor as fly ash some will inevitably remain behind. This makes necessary continual remove and replacement of small amounts of the catalyst.

Thus, in practical operation, the reactors in accordance with the invention will contain a mixture of active catalysts and inert solids. In order to take this factor into account, it was assumed that the catalyst was a mixture of $CaO/CaCO_3$, $FeO/Fe_2O_3$, and $Al_2O_3$, the latter being an inert solid, with well known thermal properties. A small portion of the $CaCO_3$ is also treated as inert.

Tables 1, 2, 3, 4 and 5 below show the results of the computational experiment.

TABLE 1

Mass Balance for Conversion of Coal, Steam, and Air into unmixed HS, $CO_2$ and $O_2$ Depleted Air Coal Gasification Reactor, 800° C., 7 atm.

| | |
|---|---|
| Input Reactants: | 3.2 $H_2O$ at 500° C. and 1.79 C at 25° C. |
| Input Solids from $CaCO_3$ Decomposition Reactor: | 2.0 FeO, 1.5 $Al_2O_3$, 0.8 CaO |
| Output Solids to $CaCO_3$ Decomposition Reactor: | 2.0 FeO, 1.5 $Al_2O_3$, 0.01 CaO, 0.79 $CaCO_3$, 1.0 C |
| Output Reaction Products: | 1.58 $H_2$, 1.62 $H_2O$, traces of $CO_2$, CO and $CH_4$ |

$CaCO_3$ Decomposition Reactor, 1042° C., 7 atm.

| | |
|---|---|
| Input Reactants: | None |
| Input Solids from Coal Gasification Reactor: | 2.0 FeO, 1.5 $Al_2O_3$, 0.01 CaO, 0.79 $CaCO_3$, 1.0 C |
| Input Solids from FeO Oxidation Reactor: | 4.0 FeO, 3.0 $Al_2O_3$, 1.6 CaO |
| Output Solids to Coal Gasification Reactor: | 2.0 FeO, 1.5 $Al_2O_3$, 0.8 CaO |

FeO Oxidation Reactor, 1526° C., 7 atm.

| | |
|---|---|
| Input Reactants: | 1.0 $O_2$, 4.0 $N_2$ |
| Input Solids from $CaCO_3$ Decomposition Reactor: | 4.0 FeO, 3.0 $Al_2O_3$, 1.6 CaO |
| Output Solids to $CaCO_3$ Decomposition Reactor: | 2.0 $Fe_2O_3$, 3.0 $Al_2O_3$, 1.6 CaO |
| Output Reaction Products: | 4.0 $N_2$ |

TABLE 2

Energy Balance for Conversion of Coal, Air and Steam into Separate Streams of $H_2$, $CO_2$ and Oxygen Depleted Air

| | Sensible Heat, kcal | $-\Delta H$ of Combustion, kcal |
|---|---|---|
| Inputs | | |
| C, 1.79 moles at 25° C. | 0 | −168.339 |
| $H_2O$, 3.2 moles at 500° C. | 12.966 | 0 |
| $O_2$, 1 mole at 500° C. | 3.628 | 0 |
| $N_2$, 4 moles at 500° C. | 13.581 | 0 |
| Totals | 30.175 | −168.339 |
| Outputs | | |
| $H_2$, 1.58 moles at 800° C. | 8.652 | −91.232 |
| $H_2O$, 1.62 moles at 800° C. | 11.243 | 0 |
| $CO_2$, 1.79 moles at 1042° C. | 21.824 | 0 |
| $N_2$, 4 moles at 1526.3° C. | 46.819 | 0 |
| Total | 88.538 | −91.232 |
| Heat released and used to raise steam during coal gasification | | −18.281 |
| Heat released and unused during $CaCO_3$ decomposition | | +0.021 |
| Heat released and unused during FeO Oxidation | | −0.406 |

Total In = 198.514 kcal, Total Out = 198.436 (this small difference represents cumulative computer errors)
Hydrogen Energy = 54.2 of carbon $\Delta H$ of Combustion
Energy to Gas Turbine = 27.8% of carbon $\Delta H$ of Combustion
Steam Raised = 10.9% of carbon $\Delta H$ of Combustion
Difference between the sensible heat of the output products and of the input reactants = $\Delta H$ of Combustion input

TABLE 3

Equilibrium for Gasification of C in the Presence of CaO at 800° C. and 7 atm.
Equilibrium Gas Phase Composition $H_2$, Mole % = 41.10
$H_2O$, Mole % = 49.98
$CO_2$, Mole % = 3.238
CO, Mole % = 2.553
$CH_4$, Mole % = 0.1288

TABLE 4

Equilibrium for Oxidation of FeO at 1526.3° C. and 7 atm $2Fe_2O_3 = 4FeO + O_2$, Equilibrium $P_{O2} = 2.44 \times 10^{-3}$ atm.

TABLE 5

Equilibrium for Decomposition of $CaCO_3$ at 1042° C. and 7 atm $CaCO_3 = CaO + CO_2$, $P_{CO2} = 7.024$ atm.

Table 1 shows the mass balance, Table 2 shows the heat/energy balance, and Tables 3, 4 and 5 show the equilibriums which occur in the three reactors. Specifically, Table 3 shows that the gasification reaction in the first bubbling bed reactor produces wet, but otherwise nearly pure hydrogen. Table 4 shows that equilibrium favors decomposition of the $CaCO_3$ in the second bubbling bed reactor, and Table 5 shows that oxidation of the FeO to $Fe_2O_3$ is favored by equilibrium in the transfer line reactor.

The heat/energy balance shown in Table 2 illustrates a minor portion of the energy content of the coal leaving the process as the difference between sensible heat of the products and reactants, i.e., only a minor portion of the input energy becomes waste heat. More than half of the energy content of the coal leaves the process in the form of hydrogen, i.e., as energy to the gas turbine. Of the remaining energy content, a portion goes to raising steam (a lower value use) and only a small amount becomes waste heat.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for performing an unmixed combustion of coal to produce separate streams of substantially pure hydrogen gas, sequestration-ready carbon dioxide gas and oxygen depleted air, said apparatus consisting of first, second and third reactors containing a mixture of fluidized solids circulating among all three reactors, said circulating solids containing coal, calcium compounds present as CaO, $CaCO_3$, and mixtures thereof, and containing iron compounds present as FeO, $Fe_2O_3$ and mixtures thereof.

2. An apparatus according to claim 1, wherein superheated steam and compressed air are used to fluidize the calcium and iron containing solids circulating in said first, second and third reactors and to cause the coal to undergo unmixed combustion producing separate streams of relatively pure carbon dioxide, oxygen depleted air and pure and hydrogen.

3. An apparatus according to claim 1, wherein said first reactor receives inputs of coal and steam and produces an output gaseous stream of wet hydrogen gas, said second reactor produces an output stream of wet $CO_2$, and said third reactor receives an input stream of air and produces an output stream of oxygen depleted air.

4. An apparatus according to claim 1, wherein superheated steam is used to fluidize the solids circulating in said second reactor and wherein heat generated by the combustion of a portion of said unreacted coal and heat from said superheated steam causes the decomposition of $CaCO_3$ back to CaO.

5. An apparatus according to claim 1, wherein compressed air is used to fluidize said solids circulating in said third reactor and oxidizes FeO to $Fe_2O_3$ to generate additional heat.

6. An apparatus according to claim 1, wherein the temperature in the first reactor is in the range 650° C. to 850° C.

7. An apparatus according to claim 1, wherein the temperature in the second reactor is in the range 1000° C. to 1100° C.

8. An apparatus according to claim 1, wherein the temperature in the third reactor is in the range 1400° C. to 1600° C.

9. An apparatus according to claim 1, wherein the pressure in the reactor system is in the range 2 to 20 atmospheres.

* * * * *